US012757145B2

(12) United States Patent
Carrion Rodrigo

(10) Patent No.: US 12,757,145 B2
(45) Date of Patent: Oct. 6, 2026

(54) GATEWAY REGISTRATION MANAGEMENT IN A NETWORK OF COMMUNICATION DEVICES

(71) Applicant: Charter Communications Operating, LLC, St. Louis, MO (US)

(72) Inventor: Inmaculada Carrion Rodrigo, San Diego, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 527 days.

(21) Appl. No.: 18/206,279

(22) Filed: Jun. 6, 2023

(65) Prior Publication Data

US 2023/0397148 A1 Dec. 7, 2023

Related U.S. Application Data

(60) Provisional application No. 63/349,900, filed on Jun. 7, 2022.

(51) Int. Cl.
*H04W 76/18* (2018.01)
*H04W 60/04* (2009.01)

(52) U.S. Cl.
CPC .......... *H04W 60/04* (2013.01); *H04W 76/18* (2018.02)

(58) Field of Classification Search
CPC ..... H04W 76/18; H04W 60/04; H04W 36/00; H04W 64/00; H04W 60/00; H04W 76/20
See application file for complete search history.

(56) References Cited

U.S. PATENT DOCUMENTS

2008/0076425 A1* 3/2008 Khetawat ............ H04W 12/069 455/436
2017/0353544 A1* 12/2017 Lala ........................ H04L 69/40
2023/0370840 A1* 11/2023 Rajadurai ......... H04W 12/0433

* cited by examiner

*Primary Examiner* — Anez C Ebrahim
(74) *Attorney, Agent, or Firm* — Armis IP Law, LLC

(57) ABSTRACT

A network server provides connectivity between multiple registered wireless gateways and multiple application servers. The network server receives a registration request from a new wireless gateway to communicate with or through network server. The network server assigns a registration counter to the wireless gateway. The registration counter tracks failed attempts of the wireless gateway to register with the network server. For each failed registration attempt by the new wireless gateway, the network server adjusts a count value of the registration counter. The network server might also track additional information related to the failed registration attempt counter, such as the reason for failure of the registration attempt.

24 Claims, 12 Drawing Sheets

GATEWAY REGISTRATION MANAGEMENT IN A NETWORK OF COMMUNICATION DEVICES

RELATED APPLICATION

This application claims the benefit of earlier filed U.S. Provisional Patent Application Ser. No. 63/349,900 entitled "GATEWAY REGISTRATION MANAGEMENT IN A NETWORK OF SENSOR DEVICES,", filed on Jun. 7, 2022, the entire teachings of which are incorporated herein by this reference.

BACKGROUND

Conventional RF (Radio Frequency) technology has been used for many years to connect wireless devices such as phones, laptops, etc., to a landline network and other wireless networks. Today, such networks support many different types of connection services such as voice communications, cell communications, high-speed data services, Wi-Fi™ connectivity, and so on.

One type of device wirelessly coupled to a network is a sensor. A so-called LoRa device (LoRa is short for Long Range) is a spread spectrum modulation technique derived from chirp spread spectrum (CSS) technology. LoRa is a long range, low power wireless platform that has become a wireless platform of Internet of Things (IoT) supporting communication of senor data to one or more destinations.

BRIEF DESCRIPTION OF EMBODIMENTS

Embodiments herein provide improved management of wireless access networks and expand use of limited wireless bandwidth in a network environment.

More specifically, a communications system includes multiple wireless gateways, a network server, and multiple application servers. A registration management resource associated with the network server and/or wireless gateway detects a registration request from a first wireless gateway to communicate with the network server. The network server is operative to route communications from the multiple wireless gateways to multiple application servers. The registration management resource assigns a registration counter to the first wireless gateway. The registration management resource adjusts a count value of the registration counter in response to each detected failed attempt by the first wireless gateway to register with the network server. In general, the registration counter tracks a number of failed attempts by the first wireless gateway to register with the network server.

In one nonlimiting example, in furtherance of registering with the network server, the first wireless gateway communicates with a proxy server to retrieve a network address assigned to the network server. The first wireless gateway uses the network address to communicate one or more registration requests from the first wireless gateway to the registration management resource. Registration of the first wireless gateway with the network server 191 subsequently enables the first wireless gateway to receive communications from one or more wireless communication devices and transmit those communications through the network server to one or more application servers.

In still further example embodiments, the registration request includes information such as an identity of the first gateway, a manufacturer model of the first wireless gateway, a specification version supported by the first wireless gateway, and so on. When the registration management resource detects the failed attempt by the first wireless gateway to register with the network server, the registration management resource adjusts the count value of the registration counter. For example, in one embodiment, in response to detecting that the identity of the first wireless gateway is not present in a set of identities of wireless gateways to be supported by the network server for a respective registration request, the registration management resource adjusts a magnitude of the registration counter indicating failed attempts of the for wireless gateway to register with the network server.

Further examples herein include, at the network server, discontinuing subsequent attempted registration of the wireless gateway with the network server in response to detecting that a numerical value (count value) stored in the registration counter is greater than a threshold value.

Still further examples herein include, via the registration management resource, creating the registration counter assigned to the first wireless gateway in response to receiving a first registration request from the wireless gateway, the first registration request being a first attempt by the wireless gateway to register with the network server.

Yet further examples herein include, at the wireless gateway, discontinuing subsequent attempted registration with the network server in response to detecting that a numerical count value stored in the registration counter is greater than a threshold value.

Still further examples herein include, at the network server, instructing the first wireless gateway to modify the subsequent registration request with the network server or modify parameters of operating the wireless gateway in response to detecting that a numerical value stored in the registration counter is greater than a threshold value. In one example, the registration counter is associated with the number of failed registrations attempts by the wireless gateway due to failure to construct the registration request in a proper format communicated to the network server. In response to receiving an indication from the network server to modify a subsequent registration request, the wireless gateway modifies subsequent attempted registration with the network server by communicating a modified registration request from the wireless gateway to the network server.

In accordance with still further examples as discussed herein, the communication management resource or other suitable entity as discussed herein can be configured to assign a counter to or maintain a counter associated with the first wireless gateway and/or network server. The communication management resource detects a failed conveyance or execution of a message (such as a command) over a communication link extending between the first wireless gateway and a network server. The network server is operative to route communications from multiple wireless gateways to multiple application servers. The communication management resource adjusts a count value of the counter in response to detecting the failed conveyance or execution of the message over the communication link.

Note that the message communicated from the first wireless gateway can be a registration request message (command) communicated from the first wireless gateway to the network server to register the first wireless gateway with the network server to communicate with a first application server of the multiple application servers. Further, the communication management resource can be configured to discontinue subsequent attempted registration of the first wireless gateway with the network server in response to detecting that a numerical count value stored in the counter is greater than a threshold value.

In accordance with still further examples, the message (command) can be a request message to register the first wireless gateway with the network server. The first wireless gateway can be configured to retrieve a network address assigned to the network server from a proxy server and communicate the request message to the network address.

Still further, the message (such as a command) from the first wireless gateway to the network server can be a registration request including an identity of the first wireless gateway. The communication management resource adjusts the count value of the counter in response to the communication management resource (such as network server) detecting that the identity of the first wireless gateway is not present in a set of identities of wireless gateways to be supported by the network server.

Yet further examples as discussed herein include the communication management resource maintaining the counter assigned to the first wireless gateway in response to receiving a first registration request from the first wireless gateway. The first registration request may be a first attempt by the first wireless gateway to register with the network server.

In accordance with another example, the first wireless gateway can be configured to discontinue subsequent attempted registration with the network server in response to detecting that a numerical count value stored in the counter is greater than a threshold value.

In yet another example, the communication management resource receives a notification from the network server. The notification instructs the first wireless gateway to modify a subsequent registration request with the network server in response to detecting that a numerical value stored in the registration counter is greater than a threshold value. The first wireless gateway modifies the subsequent registration request in response to receiving the notification.

The message from the wireless gateway to the network server can be configured to include a data packet transmitted from the first wireless gateway for delivery over the communication link and to the network server. The count value in the counter indicates a number of detected failed conveyance or execution of a respective message over the communication link from the first wireless gateway to the network server. Accordingly, the network server can be notified of prior attempts of the first wireless gateway transmitting communications to it. The communication management resource discontinues subsequent attempted transmission of communications from the first wireless gateway over the communication link to the network server in response to detecting that a numerical value stored in the counter is greater than a threshold value.

Techniques as discussed herein are useful over conventional techniques. For example, implementation of a configuration management resource and corresponding operations of managing registration attempts as discussed herein provides improved and expeditious implementation of wireless networks to provide wireless connectivity to different users.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium, any computer readable hardware storage medium, etc., on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: receive notification of a registration request from a wireless gateway to communicate with a network server, the network server in communication with multiple application servers; assign a registration counter to the wireless gateway, the registration counter operative to track failed attempts of the wireless gateway to register with the network server; and adjust a count value of the registration counter in response to detecting a failed attempt by the wireless gateway to register with the network server.

Another embodiment includes a computer readable storage medium and/or system having instructions stored thereon. The instructions, when executed by the computer processor hardware, cause the computer processor hardware (such as one or more co-located or disparately processor devices or hardware) to: detect a failed conveyance or execution of a message (such as a command) over a communication link between a first wireless gateway and a network server, the network server operative to route communications from multiple wireless gateways to multiple application servers; and adjust a count value of a counter in response to detecting the failed conveyance of the message over the communication link.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved wireless connectivity in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
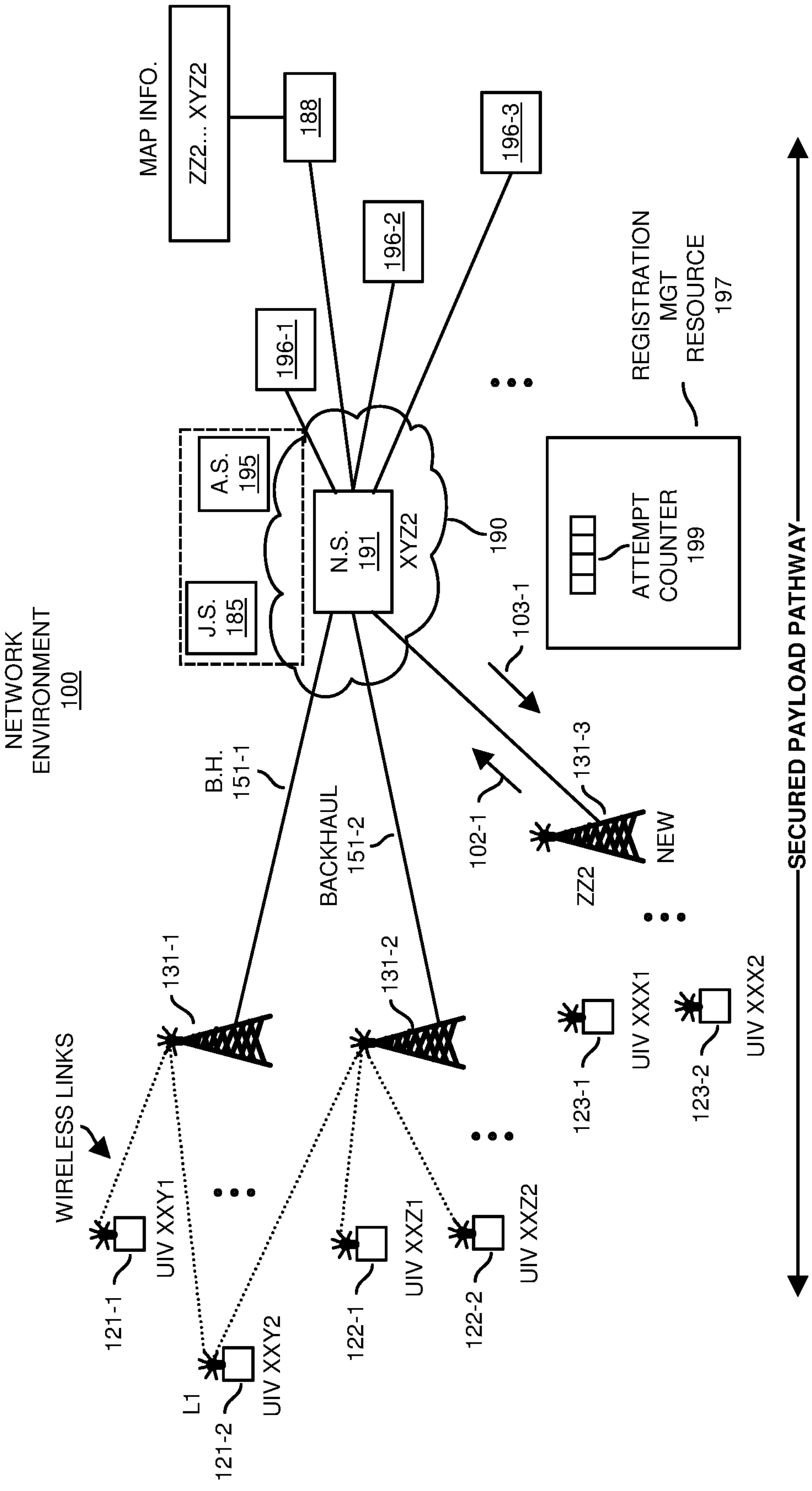
FIG. 1 is an example diagram illustrating implementation of a registration management resource and implementation of a newly installed wireless gateway and attempted registration as discussed herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

FIG. 1 is an example diagram illustrating implementation of a configuration management system and related components according to embodiments herein.

As shown, the network environment 100 includes registration management resource 197 (a.k.a., communication management resource), network server 191, as well as one or more communication device 121-1, communication device 121-2, . . . , communication device 122-1, communication device 122-2, . . . , communication device 123-1, communication device 123-2, etc.

Network environment 100 further includes one or more of the following components: gateway 131-1, gateway 131-2, gateway 131-3, join server 185, authentication server 195, network server 191, application server 196-1 (a.k.a., AS), application server 196-2, application server 196-3, and so on.

As further discussed herein, after registration with the network server 191, each of the wireless gateways 131-1, 131-2, etc., receives wireless communications from the communication devices 121, communication devices 122, etc., and forwards them to the network server 191. For each received communication, the network server 191 determines which of multiple applications servers to which the communication from the communication device is to be forwarded. The network server 191 then forwards the communication to the one or more appropriate destination application servers.

In one embodiment, note that the network environment 100 and corresponding communication management entities are implemented in accordance with LoRa™ although the system as discussed herein can be implemented to support any wireless communication protocols.

Note that the join server 185 and the authentication server 195 and corresponding functionality can be implemented via a single computer. In such an instance, the JS (Join Server) provides join aspects as well as acts as an authenticator for the devices, so from this perspective, the join server and authentication server may be one and the same providing different functions. Alternatively, each of the different functions associated with the join server 185 and the functions associated with the authentication server 195 can be implemented by disparately located computers.

Note that each of the resources as discussed herein can be implemented in any suitable manner. For example, the registration management resource 197 (such as communication management resource, communication management hardware, etc.) can be implemented as registration management hardware (communication management hardware), registration management software (communication management software), or a combination of registration management hardware and registration management software; each respective wireless gateway can be implemented as gateway hardware, gateway software, or combination of gateway hardware and gateway software; join server 185 can be implemented as join server hardware, join server software, or a combination of joint server hardware and joint server software; authentication server 195 can be implemented via authentication server hardware, authentication server software, or combination of authentication server hardware and authentication server software; network server 191 can be implemented via network server hardware, network server software, or combination of network server hardware and network server software; each respective application server 196 can be implemented as application server hardware, application server software, or combination of application server hardware and application server software; each of the communication devices (such as 121-1, 121-2, . . . , 122-1, 122-2, . . . 123-1, 123-2, . . . ) can be implemented as communication device hardware, communication device software, or combination of communication device hardware and communication device software; and so on.

As further shown, each of the communication devices in the network environment 100 is assigned a respective unique identifier value so that the communication management entities (such as gateways, join server, authentication servers, network servers, application servers, etc.) in the network environment 100 can track collected data as well as track an identity of a corresponding communication device to which the corresponding data and/or communications pertain.

More specifically, communication device 121-1 is assigned unique identifier value XXY1 (such as one or more of a unique network address or addresses, globally unique identifier value, etc.) communication device 121-2 is assigned unique identifier value XXY2, communication device 122-1 is assigned unique identifier value XXZ1, communication device 122-2 is assigned unique identifier value XXZ2, communication device 123-1 is assigned unique identifier value XXX1, communication device 123-2 is assigned unique identifier value XXX2, etc.

Each of the communication devices in network environment 100 is configured to execute one or more functions. For example, a respective communication device (such as a sensor device) can be configured to monitor any parameter such as temperature, pressure, weather conditions, vending machine data, etc., and communicate such information to a one or more corresponding application servers 196 in the network environment 100.

Assume in this example embodiment that the communication device 121-2 collects data associated with monitoring a temperature or other parameter at location L1 where the communication device 121-2 resides. Assume further that the server resource 196-1 manages data generated by the communication device 121-2.

In accordance with scheduled operations, assume that the communication device 121-2 generates a join request to communicate over a respective wireless link to the gateway 131-1. The gateway 131-1 forwards the respective join request over backhaul 151-1 to the join server 185. The joint server 185 processes the request and forwards it to the authentication server 195. If the communication device 121-2 provides the appropriate credentials to access the network, the authentication server 195 communicates acceptance of the join request to the join server 185. The join server 185 further communicates a join except message over backhaul 151-1 through the gateway 131-1 to the communication device 121-2. The communication device 121-2 is then provided a communication path (such as secured payload pathway such as including encrypted data) through the gateway 131-1 and the network server 191 to the application server 196-1. Each of the communication devices it is able to communicate through a respective wireless gateway and work server 191 to the appropriate one or more application service 196.

Subsequent to authentication, the communication device 121-2 communicates respective messages through the gateway 131-1, and the network server 191 to the application server 196-1. The application server 196-1 processes and stores the received data each time the communication device 121-2 provides updated information associated with temperature or other one or more monitored parameters.

In a similar manner, the communication device 121-2 can be configured to communicate through the gateway 131-2 and over backhaul 151-2 to the join server 185. Subsequent to authentication, the communication device 121-2 can be configured to communicate collected data through the gateway 131-2 over backhaul 151-2 and through the network server 191 to the application server 196-1.

As a further example, the new wireless gateway 131-3 can be a provisioned resource for supporting wireless connectivity to devices such as 123-1, 123-2, etc., in a respective geographical region. To provide gateway wireless connectivity, the wireless gateway 131-3 must first register with the network server 191 as further discussed herein. Embodiments herein include, among other things, via the registration management resource 197 or other suitable entity, managing failed attempts by the wireless gateway 131-3 to register with the network server 191 and managing same.

More specifically, network environment 100 includes registration management resource 197 disposed at any suitable location. The registration management resource 197 stores registration attempt information (such as number of registration attempt failures for each registration failure type, corresponding type of registration failure, etc.) associated each of one or more attempts by the wireless gateway 131-3 to register with the network server 191.

Note that the registration management resource can be located at any suitable location in the network environment 100 such as wireless gateway 131-3, network server 191, etc.

In this example embodiment, the wireless gateway 131-3 (identity ZZ2) would like to register with the network server 191 to convey communications from one or more wireless communication devices 123 to the network server 191. The network server 191 forwards the communications to the appropriate one or more target application servers 196.

In accordance with still further examples, the wireless gateway 131-3 is configured to first communicate its identity ZZ2 to a proxy server 188 to retrieve a network address of a network server to which the wireless gateway 131-3 is to register itself. The proxy server 188 or other suitable entity includes a mapping of the identity ZZ2 associated with wireless gateway 131-1 to an identity XYZ2 assigned to the network server 191. The proxy server 188 notifies the wireless gateway 131-3 to register with the network server 191 assigned network address XYZ2. In one embodiment, the proxy server 188 provides the wireless gateway 131-3 the network address XYZ2 to the wireless gateway 131-3.

Thus, in one nonlimiting example, in furtherance of registering with the network server 191, the wireless gateway 131-3 communicates with a proxy server 188 or other suitable entity to retrieve a network address XYZ2 assigned to the network server 191. Once in a commissioned state, the wireless gateway 131-3 uses the network address XYZ2 to communicate one or more registration requests from the wireless gateway 131-3 to the network server 191 to register the wireless gateway 131-3 with the network server 191.

In this example embodiment, the wireless gateway 131-3 communicates a registration request in communication 102-1 to the network server 191. The registration management resource 197 associated with the network server 191 receives notification of the registration request communicated in communication 102-1 from the wireless gateway 131-3 to communicate with the network server 191. As previously discussed, the network server 191 is operative to route communications associated with the communication devices 121, 122, 123, etc., from the multiple wireless gateways 131 to multiple application servers.

Assume that the network server 191 or other suitable entity rejects the requested registration by the wireless gateway 131-3 or the network server 191 never receives the registration request in communications 102-1. Via communication 103-1, the network server 191 notifies the wireless gateway 131-3 of the failed attempt (via communications 102-1) to register the wireless gateway 131-3 with the network server 131. The registration management resource 197 receives notification of the failed attempt such as indicated by communications 103-1.

Further in this example, in response to the detected failed registration attempt, the registration management resource 197 assigns a registration attempt counter 199 to the wireless gateway 131-3. The registration management resource 197 adjusts a count value of the registration attempt counter 199 in response to detecting a failed attempt by the wireless gateway 131-3 to register with the network server 191. For example, as its name suggests, the attempt counter 199 tracks a number of attempts by the wireless gateway 131-3 to register with the network server 191. Thus, the registration attempt counter 199 tracks a number of failed attempts by the wireless gateway 131-3 to register with the network server 191.

In still further examples, note that the registration request in communications 102-1 can be configured to include information such as an identity ZZ2 assigned to the gateway 131-3, a manufacturer model of the wireless gateway 131-3, a specification version supported by the wireless gateway 131-3, and so on.

When the registration management resource 197 detects the failed attempt by the first wireless gateway 131-3 to register with the network server 191, the registration management resource 197 adjusts the count value of the registration attempt counter 199. For example, in one embodiment, the network server 191 determines if the network server 191 is able to support the wireless gateway 131-3. In response to the network server 191 detecting that the identity ZZ2 of the wireless gateway 131-3 is not present in a set of identities of wireless gateways to be supported by the network server 191 for a respective registration request, the registration management resource 197 adjusts a magnitude of the registration attempt counter indicating failed attempts of the for wireless gateway to register with the network server 191. In this way, the registration attempt counter 199 tracks how many times a registration attempt by the wireless gateway 131-3 fails.

Further embodiments herein include, at the network server 191 or the wireless gateway 131-3, discontinuing subsequent attempted registration of the wireless gateway 131-3 with the network server 191 in response to detecting that a numerical value stored in the registration attempt counter associated with the wireless gateway 131-3 is greater than a threshold value.

Still further examples herein include, via the registration management resource 197, creating the registration attempt counter 199 assigned to the wireless gateway 131-3 in response to receiving a first registration request (communications 102-1) from the wireless gateway 131-3. The first registration request is a first attempt by the wireless gateway 131-3 to register with the network server 191.

Still further examples herein include, at the network server 191, via communications 103-1, instructing the wireless gateway 131-3 to modify any subsequent registration request with the network server 191 in response to detecting that a numerical value stored in the registration attempt counter is greater than a threshold value.

As previously discussed, in one example, the registration attempt counter 199 is associated with the number of failed registrations attempts by the wireless gateway 131-3 due to failure to construct the one or more registration requests in a proper format communicated to the network server 191. In response to receiving an indication from the network server 191 (such as in communications 103-1, 103-2, etc.) to modify a subsequent registration request, the wireless gateway 131-3 modifies subsequent attempted registration with the network server 191 (as indicated by feedback from the network server 191 or other suitable entity) and communicates a modified registration request from the wireless gateway to the network server 191.

Figure 2:
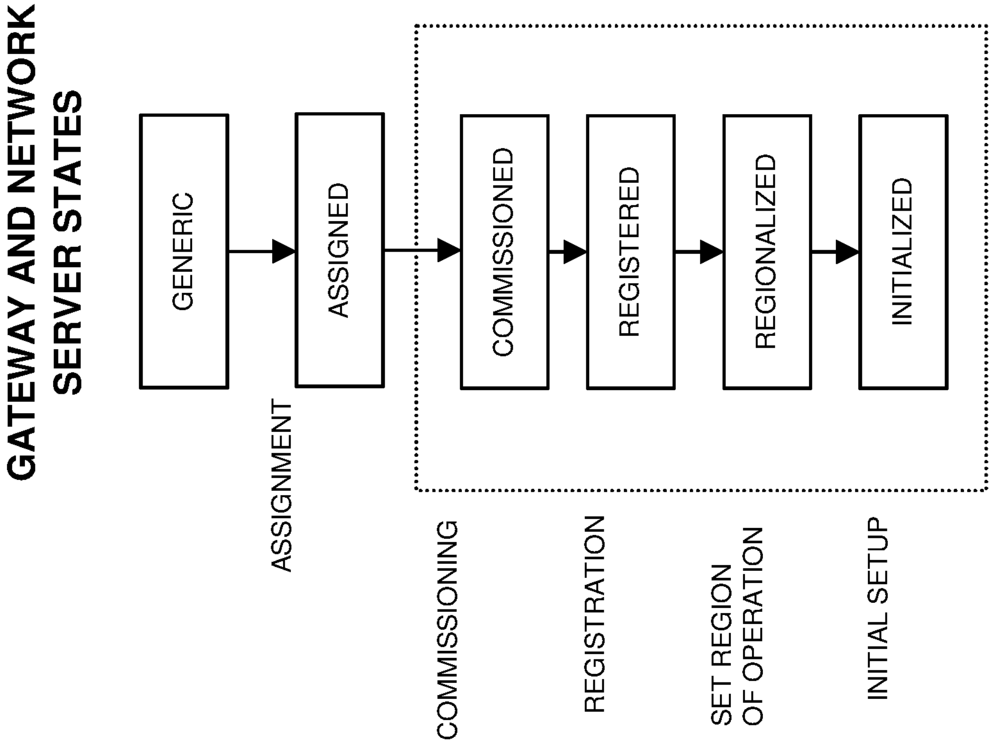
FIG. 2 is an example diagram illustrating different gateway and network server states as described herein.

FIG. 2 is an example diagram illustrating different gateway and network server states as described herein.

As previously discussed, the wireless gateway 131-3 communicates with the network server 191 to register itself for support of connectivity through the network server 191 to one or more of the application servers 196 in the network environment 100. In this example, a respective wireless gateway 131-3 is initially in a so-called GENERIC state and then an assigned an ASSIGNED state for use in the network environment 100.

Once in a COMMISSIONED state, the respective wireless gateway attempts to register with the network server 191 via further communications. If the registration attempt is successful, the wireless gateway attempts to enter the REGIONALIZED state via further communications between the wireless gateway and the network server. If the regionalization is successful, the wireless gateway attempts to enter the INITIALIZED state via further communications between the wireless gateway and the network server.

Thus, the different operational states of a respective wireless gateway include an assigned state, a commissioned state, a registered state, a regionalized state, and an initialized state depending on a level of configuration of the wireless gateway with respect to the network server.

Figure 3:
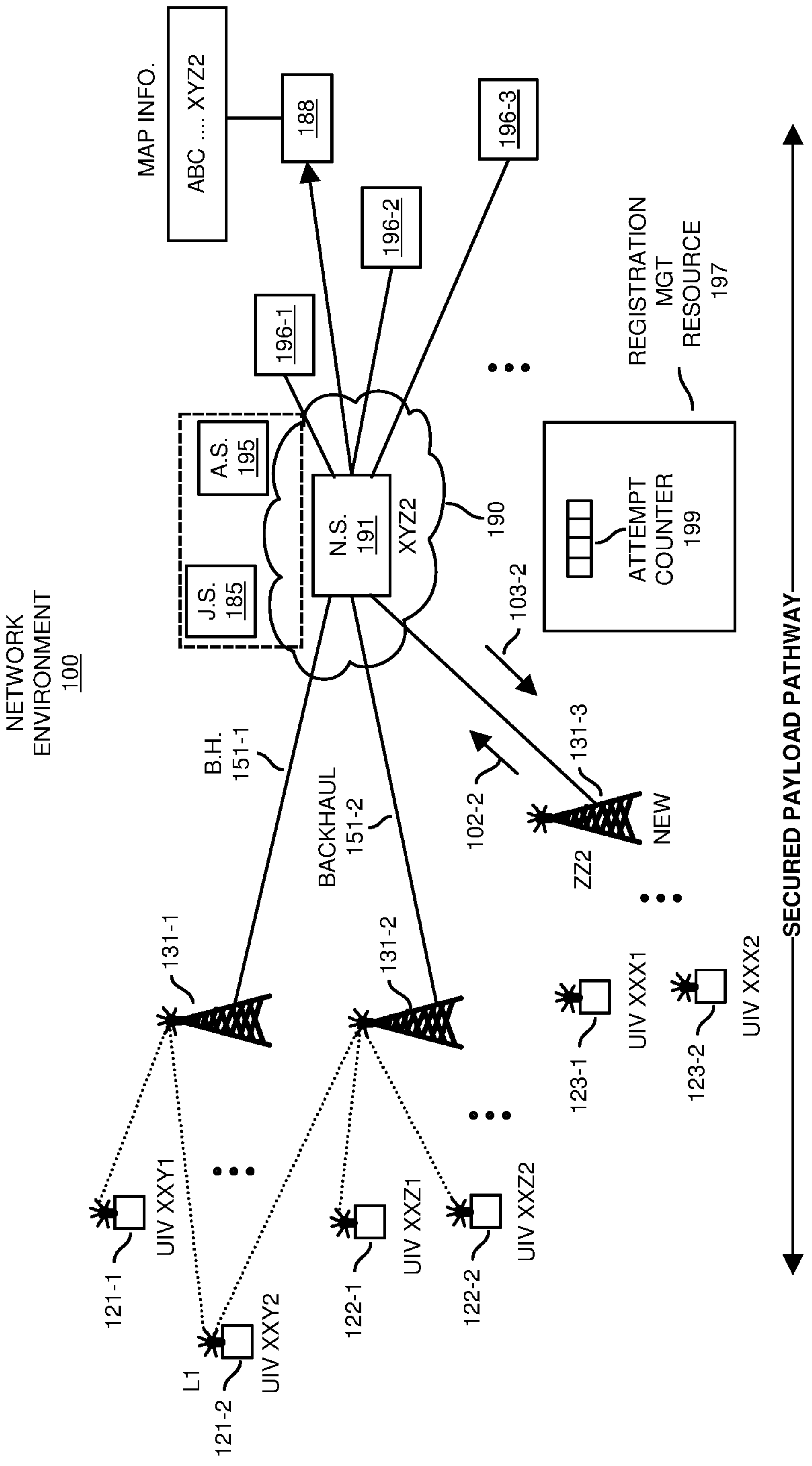
FIG. 3 is an example diagram illustrating implementation of a registration management resource and adjustment of a counter value for each attempted registration failure as discussed herein.

FIG. 3 is an example diagram illustrating implementation of a configuration management system and adjustment of a counter value for each attempted registration failure as discussed herein.

In this example embodiment, the wireless gateway 131-3 communicates a subsequent registration request in communication 102-2 to the network server 191. The registration management resource 197 associated with the network server 191 receives notification of the registration request communicated in communication 102-2 from the wireless gateway 131-3 (such as new wireless access point) to communicate with the network server 191. The attempted registration of the wireless access point 131-3 may result in a respective failure for any number of reasons.

Assume in this example, that the registration attempt via communications 102-2 fails. In such an instance, in one example, via communication 103-2, the network server 191 notifies the wireless gateway 131-3 of the failed attempt to register the wireless gateway 131-3 with the network server 191. The registration management resource 197 (a.k.a., communication management resource) receives notification of the failed attempt such as indicated by communications 103-2.

Further in this example embodiment, in response to the detected failed registration attempt such as via the response communications 103-2 or failure to receive any communication responsible, the registration management resource 197 adjusts the count value of the registration attempt counter 199 (such as modify an initial count of zero to a count value of 1) in response to detecting a failed attempt by the wireless gateway 131-3 to register with the network server 191. Thus, the registration attempt counter 199 tracks a number of failed attempts by the wireless gateway 131-3 to register with the network server 191.

Still further examples herein include, at the network server 191, via communications 103-2, instructing the wireless gateway 131-3 to modify any subsequent registration request with the network server 191 in response to detecting that a numerical value stored in the registration attempt counter is greater than a threshold value.

For example, as previously discussed, the registration attempt counter 199 is associated with the number of failed registration attempts by the wireless gateway 131-3 due to a condition such as failure of the wireless gateway 131-3 to construct the one or more registration requests (such as in communications 102-1, 102-2, etc.) in a proper format communicated to the network server 191.

While in the COMMISSIONED state, the gateway 131 may continue to communicate registration attempts to the network server 191. For each failure, as previously discussed, the registration management resource 197 increments the attempt counter 199. The registration management resource 197 can be configured to compare the value of the attempt counter 199 to a threshold value to determine when to terminate further attempts by the wireless gateway 131-3 to register with the network server 191.

More specifically, a first failed attempt (via first communications from the wireless gateway 131-3 to the network server 191) detected by the registration management resource 197 such as associated with the wireless gateway 131-3 results in the attempt counter 199 being incremented from a count value of 0 to a count value of 1. The registration management resource 197 compares the count value of 1 in the attempt counter 199 to a threshold value such as a count value of 5 or other suitable selected value. In such an instance, the current count value of 1 in the attempt counter 199 is less than the threshold value of 5. The registration management resource 197 therefore does not terminate further attempts by the wireless gateway 131-3 to register with the network 191.

Via second communications from the wireless gateway 131-3 to the network server 191, the wireless gateway 131-3 requests registration with the network server 191 again. The second communication can be tagged with information indicating that this is a second attempt and/or that a first attempt failed with no registration response from the network server 191. A second failed attempt detected by the registration management resource 197 in the wireless gateway 131-3 results in the attempt counter 199 being incremented from a count value of 1 to a count value of 2. The registration management resource 197 compares the count value of 2 in the attempt counter 199 to a threshold value such as a count value of 5 or other suitable value. In such an instance, the current count value of 2 in the attempt counter 199 is less than the threshold value of 5. The registration management resource 197 therefore does not terminate further attempts by the wireless gateway 131-3 to register with the network 191 because 2 is not greater than the threshold level of 5.

Thus, after each failed attempt, the registration management resource 197 increments the respective attempt counter 199 as well as produces respective subsequent messages on the subsequent attempt to include an indication of how many times the wireless gateway 131-3 attempted to communicate/register with the network server 191.

Further in this example, assume that a sixth failed attempt detected by the registration management resource 197 results in the attempt counter 109 being incremented from a count value of 5 to a count value of 6. The registration management resource 197 compares the count value of 6 in the attempt counter 199 to a threshold value such as a count value of 5 or other suitable value. In such an instance, the current count value of 6 in the attempt counter 199 is greater than the threshold value of 5. The registration management resource 197 therefore terminates further attempts by the wireless gateway 131-3 to register with the network server 191. The wireless gateway 131-3 remains in a COMMISSIONED state due to no response or rejection from the network server 191.

Figure 4:
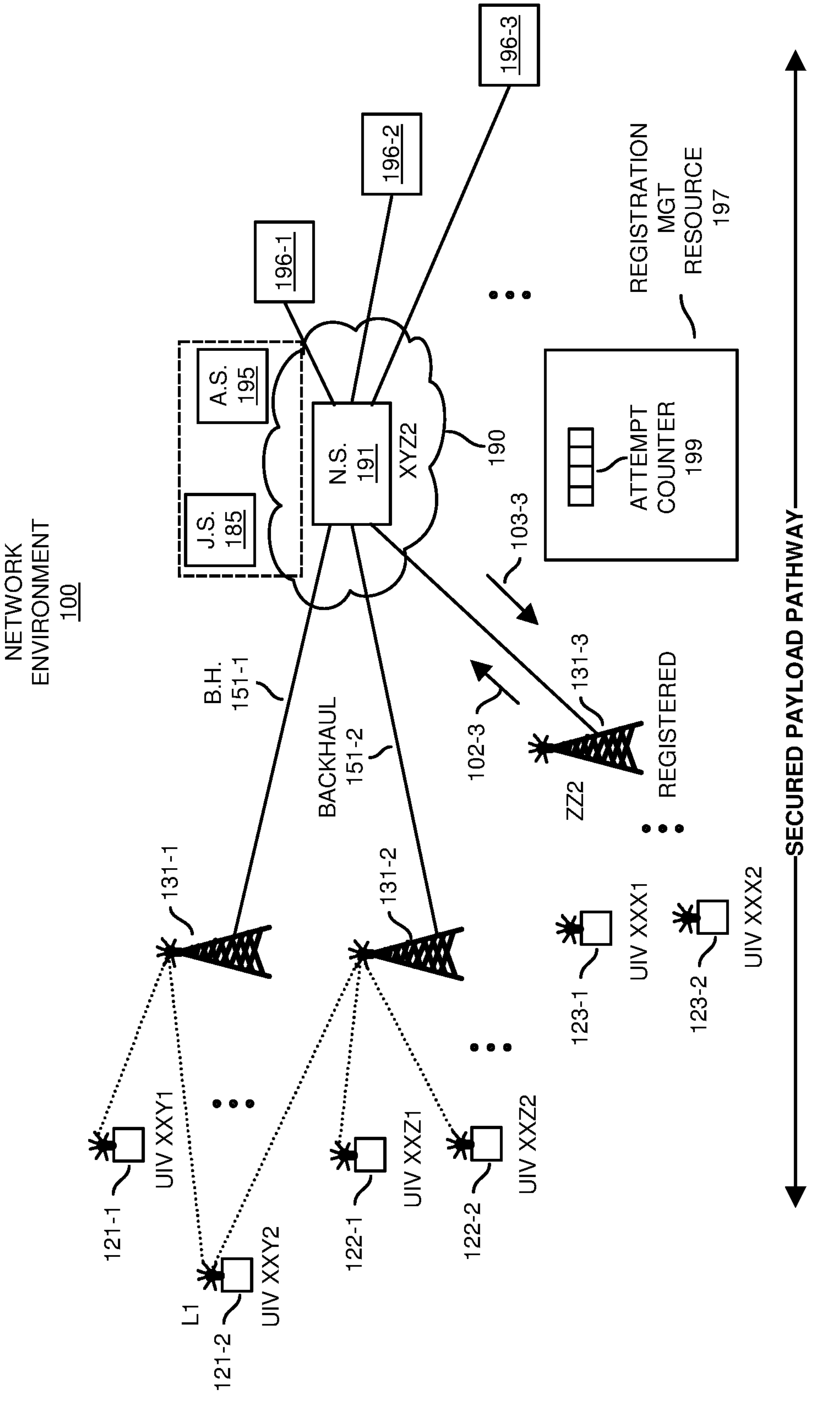
FIG. 4 is an example diagram illustrating communication of a modified registration request to the network server based on feedback from a network server as discussed herein.

As an alternative to the count value in the counter 199 increasing above a threshold level and resulting in termination of the gateway 131-2 trying to register itself with the network server 191, in response to receiving an indication from the network server 191 (such as in any of one or more communications 103-1, 103-2, etc.) indicating how to modify a subsequent registration request by the wireless gateway 131-3 to the network server 191, the wireless gateway 131-3 modifies subsequent attempted subsequent registration requests with the network server 191 as shown in FIG. 4 and communicates the modified registration request in communication 102-3 from the wireless gateway to the network server 191. Thus, the attempt counter can be used as a basis to modify behavior of the wireless gateway and prevent further failed attempts at trying to register the wireless gateway with the network server 191.

FIG. 4 is an example diagram illustrating communication of a modified registration request to the network server based on feedback from the network server as discussed herein.

As shown in FIG. 4, the network server 191 receives the modified registration request in communications 102-3 as modified per previously received communications 103-2 from the network server 191 or other suitable entity. Assume that the communications 102-3 include a proper registration request accepted by the network server 191. In such an instance, the network server 191 transmits communications 103-3 to the wireless gateway 131-3 indicating that the wireless gateway 131-3 is now registered to provide wireless connectivity to communication devices 123.

Figure 5:
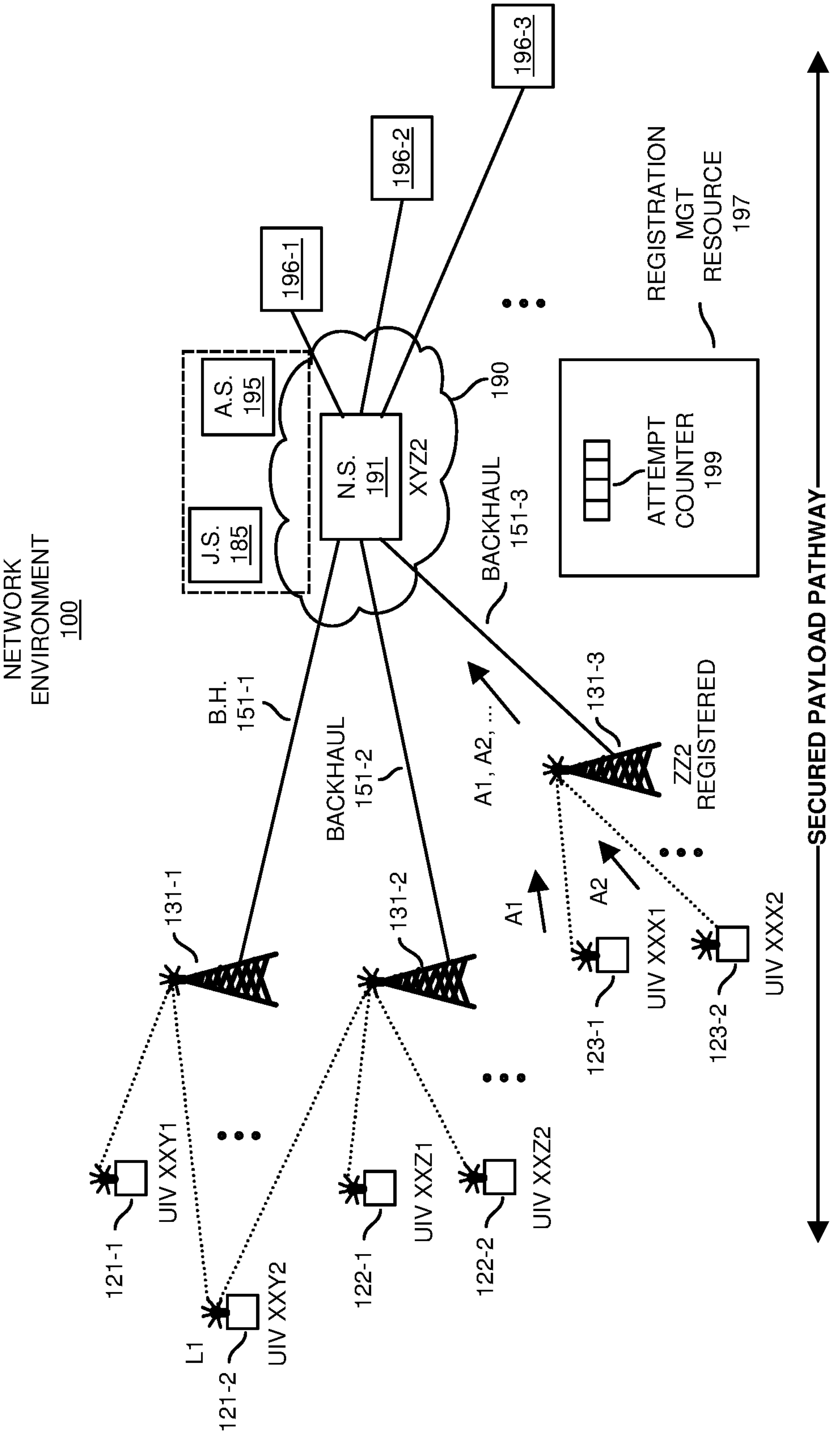
FIG. 5 is an example diagram illustrating a wireless gateway providing wireless connectivity to multiple communication devices and communication of messages from the communication devices to the network server for distribution as discussed herein.

FIG. 5 is an example diagram illustrating a wireless gateway providing wireless connectivity to multiple communication devices and communication of messages from the communication devices to the network server for distribution as discussed herein.

In response to now being registered based on a successful registration with the network server 191, the wireless gateway 131-3 receives communications A1, A2, etc., from the communication devices 123-1, 123-2, etc., and communicates the data in those received communications A1, A2, etc., or the communications themselves to the network server 191 for appropriate distribution by the network server 191 to one or more application servers 196.

Figure 6:
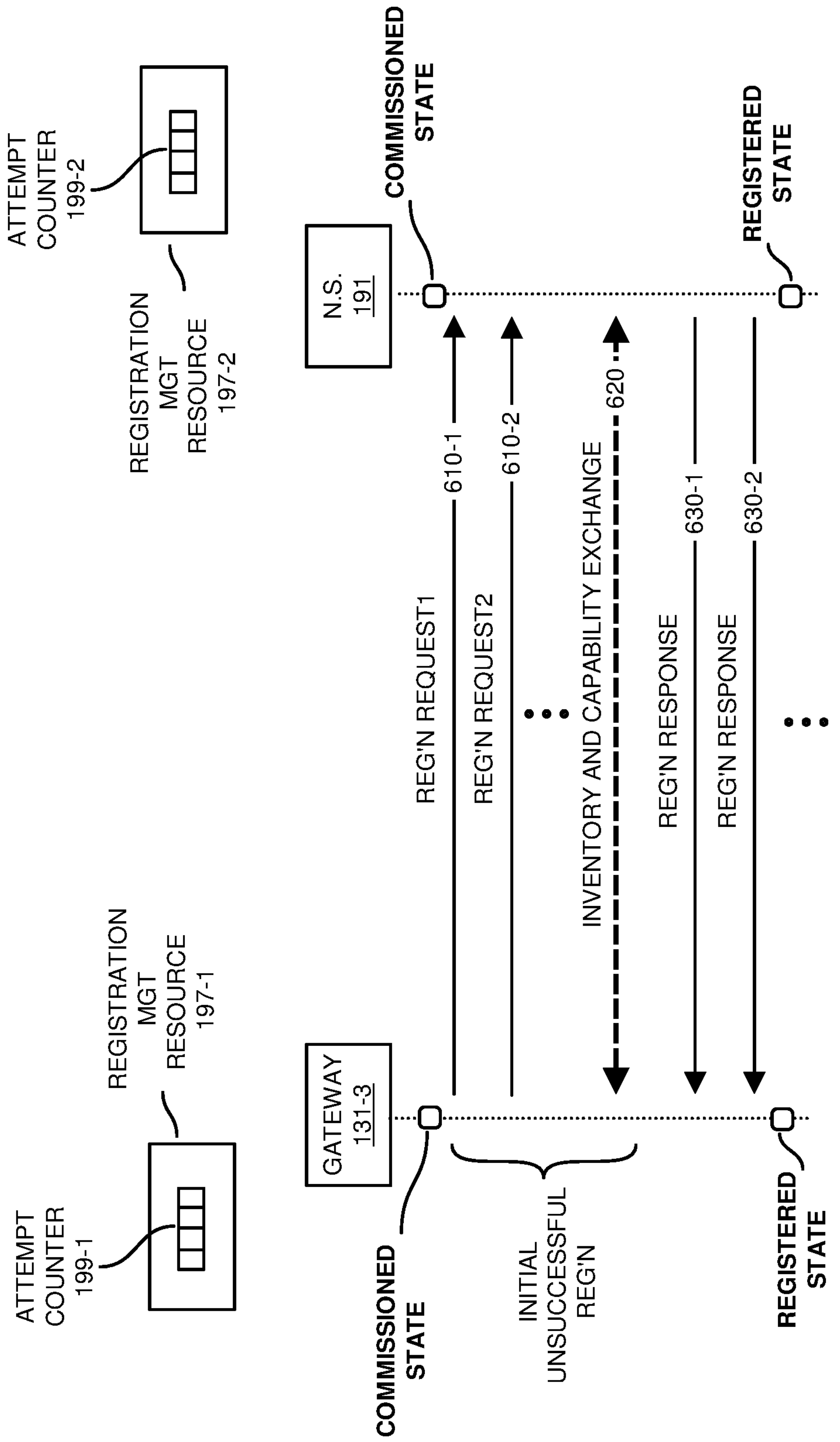
FIG. 6 is an example data flow timing diagram illustrating communication flow between a wireless gateway and network server and tracking of communication failures as discussed herein.

FIG. 6 is an example diagram illustrating each of multiple entities tracking failed communication attempts as discussed herein.

For example, as previously discussed, the wireless gateway 131-3 can be configured to attempt registration with the network server 191 to support a secured pathway for communication devices to multiple application servers. For each failed attempt (such as communications 610-1, communications 610-2, etc.), the registration management resource 197-1 associated with the wireless gateway 131-3 increments the attempt counter 199-1 and communicates number of failure attempts in communications to the network server 191.

If the registration request communicated to the network server 191 is eventually successful prior to exceeding the threshold level of 5 failed attempts, the communications 620 support notification of inventory and capability exchange between the gateway 131-3 and the network server 191.

As previously discussed, in response to receiving the notification of the failed attempts as indicated by the counter 199-1 and received communications, the network server 191 can be configured to modify one or more communications parameters supporting connectivity between the wireless gateway 131-3 and the network server 191 to prevent future failed attempts by the gateway 131-3 to register with the network server 191.

As further shown, the more specifically 191 can be configured to include a respective registration management resource 197-2 that tracks the number of attempts (such as registration response 630-1, registration response 630-2, etc.), by the network server 191 to communicate with the gateway 131-3. For each failed attempt of the network server 191 trying to communicate with the gateway 131-3, the registration management resource 197-2 increments the town value stored in the attempt counter 199-2. Accordingly, each of the gateway 131-3 and the network server 191 can be configured to track occurrence of failed messages (execution of commands or failed conveyance of messages) from one entity to another.

Figure 7:
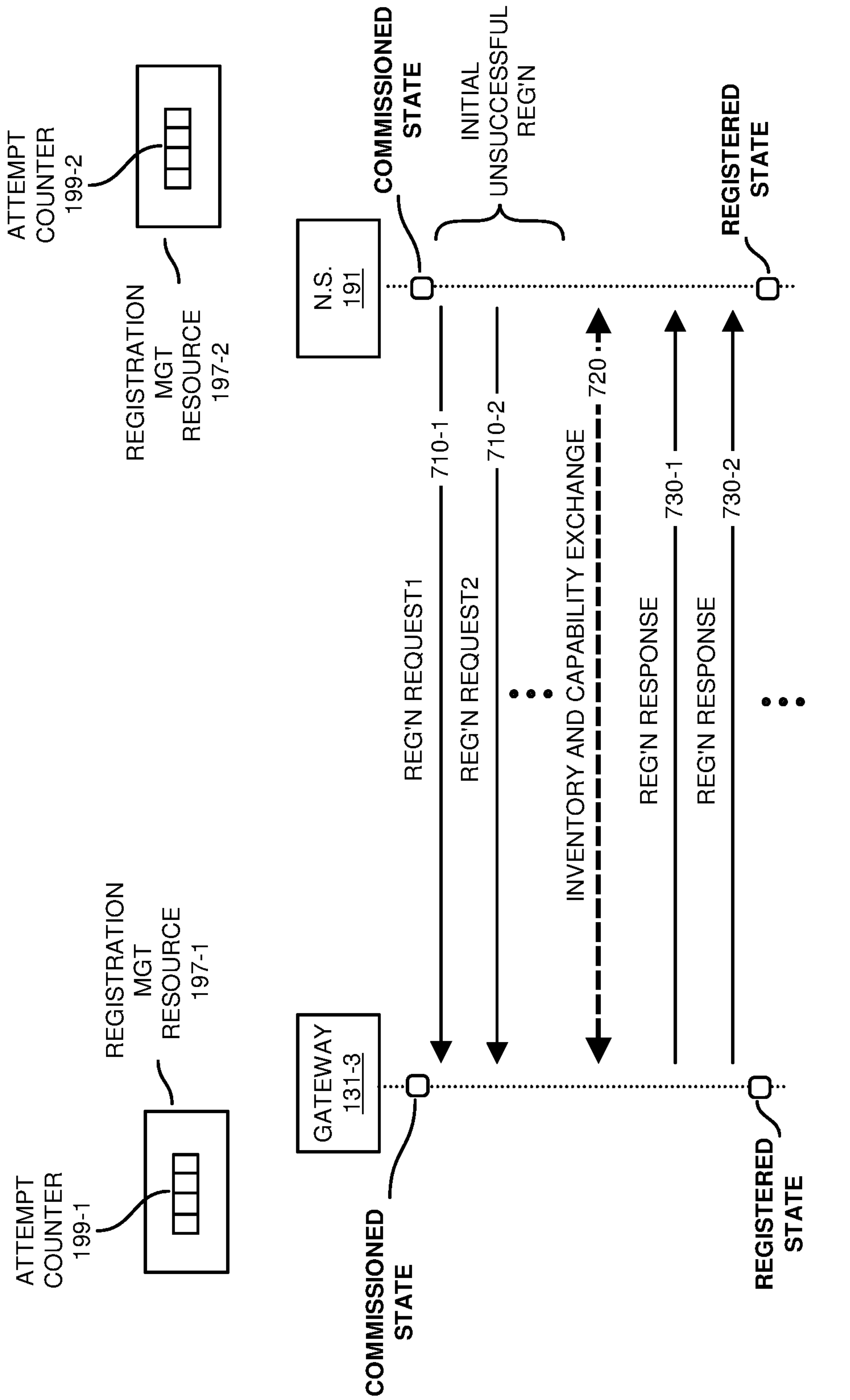
FIG. 7 is an example data flow timing diagram illustrating communication flow between a wireless gateway and network server and tracking of communication failures as discussed herein.

FIG. 7 is an example diagram illustrating each of multiple entities tracking failed attempts to perform registration as discussed herein.

In this example embodiment, the network server 191 can be configured to attempt registration of the gateway 131-3 with the network server 191 to support a secured pathway for communication devices to multiple application servers.

For each failed communication attempt (such as communications 710-1, communications 710-2, etc.) of the network server 191 communicating a respective registration request to the gateway 131-3 and not receiving an appropriate response from the gateway 131-3 within a corresponding timeout period, the registration management resource 197-2 associated with the registration management resource 197-2 increments a count value in the attempt counter 199-2 and communicates the number of failure attempts in subsequent communications (such as in a flag data field) to the network server 191. For example, communication 710-2 can be configured to include a respective count value indicating the failure of the gateway 131-3 receiving or acknowledging receipt of the communications 710-1.

If the registration request from the network server 191 is eventually successful prior to exceeding the threshold level of 5 or other suitable value of failed attempts, the communications 720 support notification of inventory and capability exchange between the gateway 131-3 and the network server 191.

In response to receiving the notification of the failed attempts as indicated by the counter 199-2 and received communications, the network server 191 and/or the gateway 131-3 can be configured to modify one or more communications parameters supporting connectivity between the wireless gateway 131-3 and the network server 191 to prevent future failed attempts by the network server 191 to register the gateway 131-3 with the network server 191.

Thus, the network server 191 can be configured to include a respective registration management resource 197-2 that tracks the number of attempts by the network server 191 to communicate with the gateway 131-3.

Figure 8:
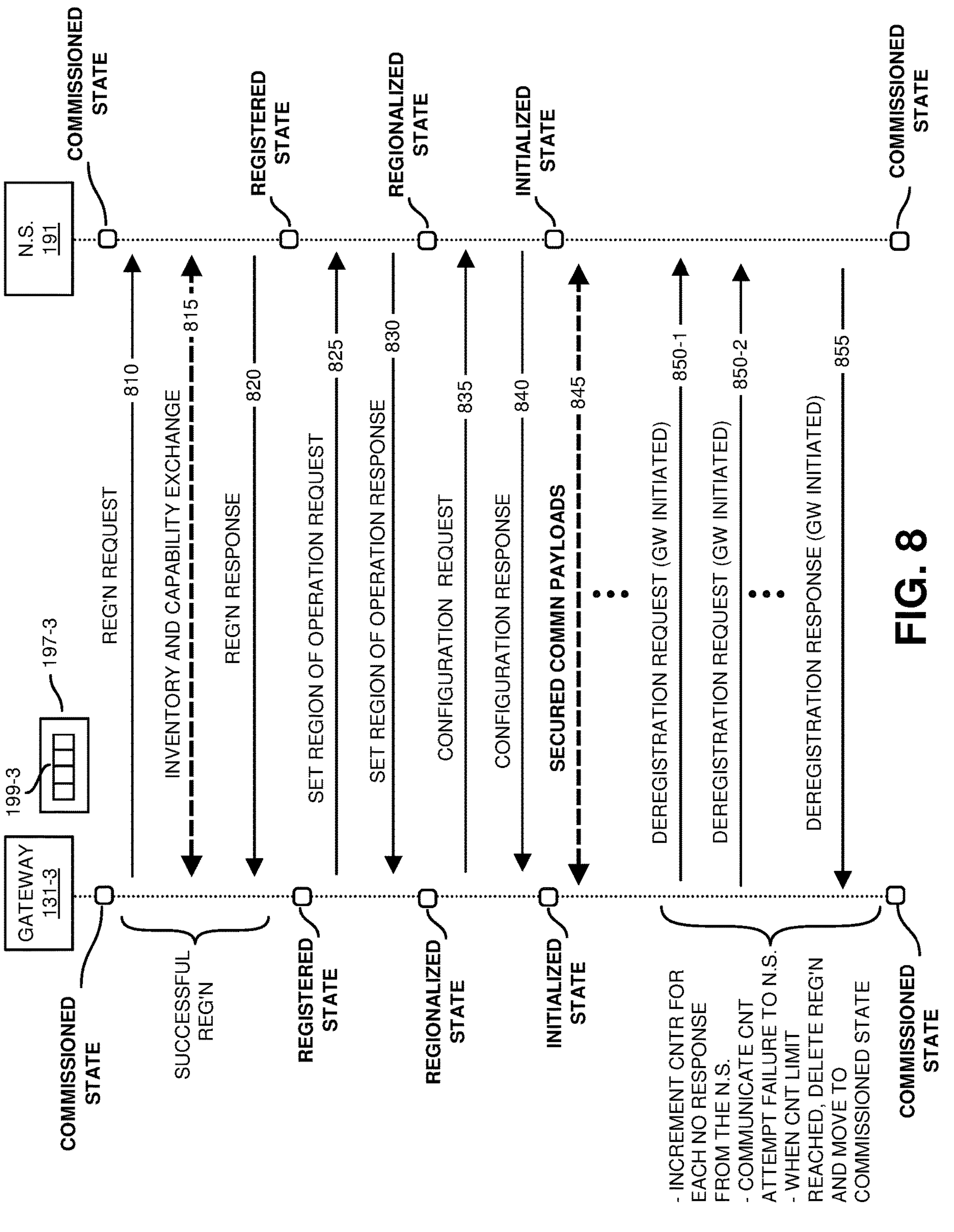
FIG. 8 is an example data flow timing diagram illustrating communication flow between a wireless gateway and network server and tracking of communication failures as discussed herein.

FIG. 8 is an example data flow timing diagram illustrating communication flow between a wireless gateway and network server and tracking communication failures as discussed herein.

As previously discussed, the wireless gateway 131-3 can be configured to attempt registration with the network server 191 to support a secured pathway for connectivity of corresponding communication devices to multiple application servers through a combination of the wireless gateway and the network server 191.

For example, to register the wireless gateway 131-3 with the network server 191, the wireless gateway 131-3 communicates a registration request via communications 810 to the network server 191.

Via communications 815, the gateway 131-3 and the network server 191 exchange inventory and capability information.

Via communications 820, to complete registration, the network server 191 communicates a respective registration response to the wireless gateway 131-3. The wireless gateway 131-3 is now registered with the network server 191.

While in the registered state, the wireless gateway 131-3 transmits communications 825 including a set region of operational request to the network server 191. In response to receiving the request in communications 825, the network server 191 transmits communications 830 including a set region of operation response. The wireless gateway 131-3 is now in the regionalized state.

While in the regionalized state, the wireless gateway 131-3 communicates a configuration request via communications 835 to the network server 191. In response to receiving the request in communications 835, the network server 191 transmits communications 840 including a configuration response message to the wireless gateway 131-3. The wireless gateway 131-3 is now set to the initialized state.

Via communications 845, the communication link (a.k.a., backhaul 151-3) supports conveyance of secured communication payloads between communication devices 123 and corresponding one or more application servers 196 through the combination of the gateway 131-3 and the network server 191.

As further shown, the wireless gateway 131-3 can be configured to initiate deregistration with the network server 191. For example, via communications 850-1, the wireless gateway 131-3 sends a respective deregistration request to the network server 191. The wireless gateway 131-3 expects to receive a corresponding deregistration response from the network server 191 within a timeout duration. In this example, the gateway 131-3 fails to receive a respective deregistration response within the timeout duration, resulting in incrementing of the counter 199-3 associated with the registration management resource 197-3.

In a similar manner as previously discussed, each time the wireless gateway 131-3 communicates a respective deregistration request to the network server 191 and the network server 191 fails to respond within a corresponding timeout duration, the registration management resource 197-3 increments the counter 199-3 to indicate the number of times that the network server 191 did not properly receive and/or respond to the deregistration request transmitted by the wireless gateway 131-3.

In this example, as previously discussed, the gateway 131-3 transmits a first deregistration request in the communications 850-1 and increments the counter 199-3 in response to failing to receive an appropriate deregistration response from the network server 191 within a timeout duration; the gateway 131-3 transmits a second deregistration request in the communications 850-2 and increments the counter 199-3 in response to failing to receive an appropriate deregistration response from the network server 191 within a timeout duration; and so on.

If desired, the wireless gateway 131-1 can be configured to transmit a notification indicating the failed attempt by the wireless gateway 131-3 to receive a response from the network server 191. For example, the wireless gateway 131-3 can be configured to communicate a message in the communications 850-2 indicating the prior failure of the network server 191 responding to the original communications 850-1. Accordingly, the network server 191 can be notified of communication issues associated with deregistration of the wireless gateway 131-3.

In a similar manner as previously discussed, the wireless gateway 131-3 can be configured to discontinue transmitting deregistration requests to the network server 191 in response to detecting that the magnitude of the count value stored in the counter 199-3 is greater than a respective threshold level. For example, if the value of the counter 199-3 exceeds a respective threshold level, the gateway 131-3 can be configured to automatically terminate the current registration of the wireless gateway 131-3 with the network server 191 and change the state of the wireless gateway 131-3 from the initialized state to the commissioned state. The wireless gateway 131-3 is then able to potentially register with a different network server 191.

In this example, rather than terminating to the initialized state based on lack of the deregistration acknowledgment, the network server 191 does eventually receive the deregistration request and eventually respond with a corresponding deregistration response to the wireless gateway 131-3 via communications 855 transmitted from the network server 191 to the gateway 131-3. Based on the receipt of the deregistration response in communications 855, the wireless gateway 131-3 then transitions to the commissioned state again in response to receiving the deregistration response from the network server 191.

Accordingly, deregistration can occur in response to detecting that a magnitude of the count value stored in the counter 199-3 exceeds a respective threshold value. Alternatively, deregistration can occur in response to the wireless gateway 131-3 receiving a respective deregistration response from the network server 191.

Figure 9:
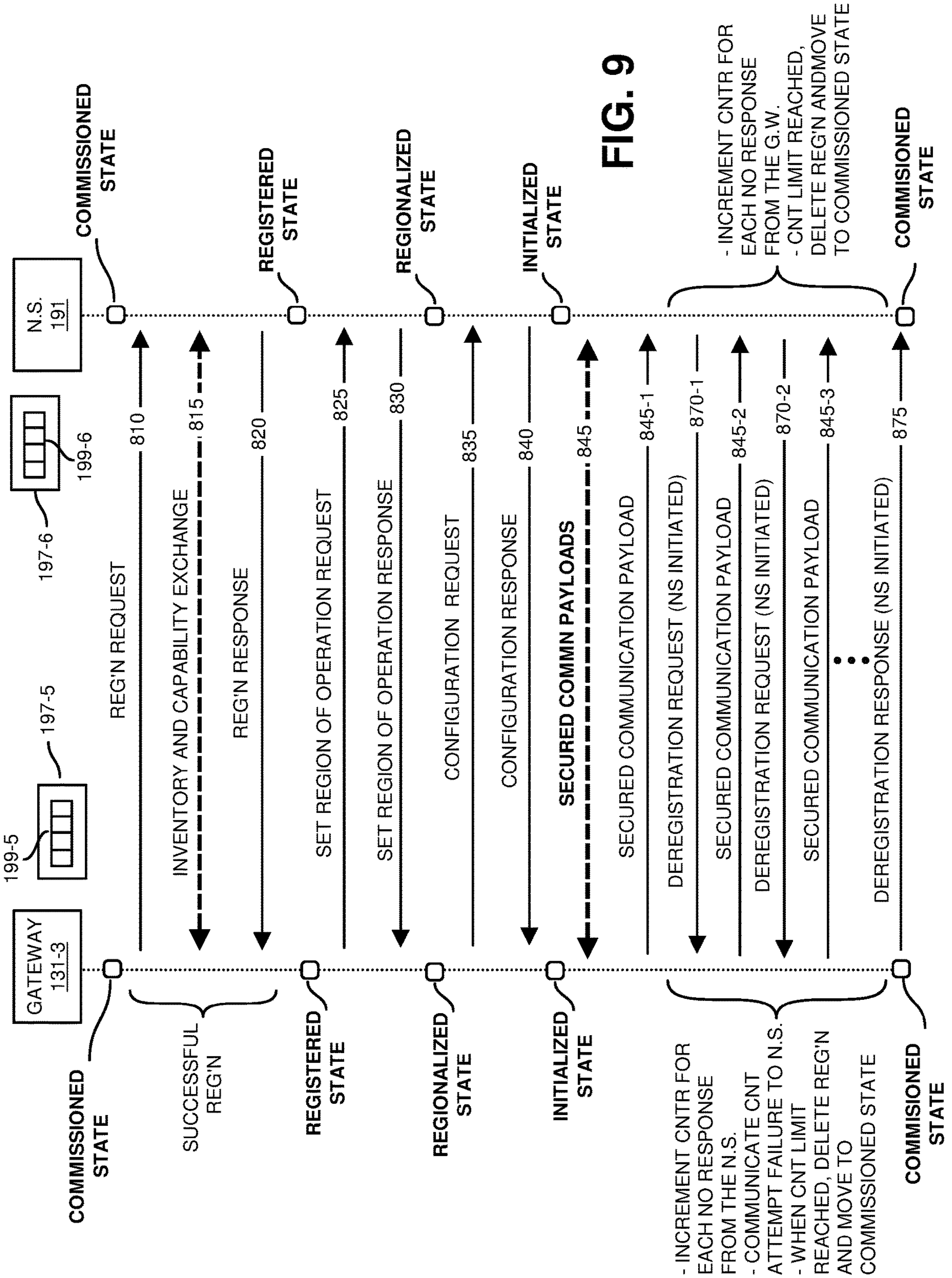
FIG. 9 is an example data flow timing diagram illustrating communication flow between a wireless gateway and network server and tracking of communication failures as discussed herein.

FIG. 9 is an example data flow timing diagram illustrating communication flow between a wireless gateway and network server and tracking communication failures as discussed herein.

As previously discussed, the wireless gateway 131-3 can be configured to attempt registration with the network server 191 to support a secured pathway for connectivity of corresponding communication devices to multiple application servers through a combination of the wireless gateway and the network server 191.

For example, to register the wireless gateway 131-3 with the network server 191, the wireless gateway 131-3 communicates a registration request via communications 810 to the network server 191.

Via communications 815, the gateway 131-3 and the network server 191 exchange inventory and capability information.

Via communications 820, to complete registration, the network server 191 communicates a respective registration response to the wireless gateway 131-3. The wireless gateway 131-3 is now registered with the network server 191.

While in the registered state, the wireless gateway 131-3 transmits communications 825 including a set region of operation request to the network server 191. In response to receiving the request in communications 825, the network server 191 transmits communications 830 including a set region of operation response. The wireless gateway 131-3 is now in the regionalized state.

While in the regionalized state, the wireless gateway 131-3 communicates a configuration request via communications 835 to the network server 191. In response to receiving the request in communications 835, the network server 191 transmits communications 840 including a configuration response message to the wireless gateway 131-3. The wireless gateway 131-3 is now set to the initialized state.

Via communications 845, the communication link (a.k.a., backhaul 151-3) supports conveyance of secured communication payloads between communication devices 123 and corresponding one or more application servers 196 through the combination of the gateway 131-3 and the network server 191.

Via communications 845-1, the communication link (a.k.a., backhaul 151-3) supports conveyance of secured communication payloads between communication devices 123 and corresponding one or more application servers 196 through the combination of the gateway 131-3 and the network server 191.

As further shown, the network server 191 can be configured to initiate deregistration of the wireless gateway 131-3 with the network server 191. For example, via communications 870-1, the network server 191 sends a respective deregistration request to the wireless gateway 131-3. The network server 191 expects to receive a corresponding deregistration response from the wireless gateway 131-3 within a timeout duration. In this example, assume that the network server 191 fails to receive a respective deregistration response within the timeout duration, resulting in the registration management resource 197-6 incrementing the counter 199-6 associated with the network server 191.

In a similar manner as previously discussed, each time the network server 191 communicates a respective deregistration request to the wireless gateway 131-3 and the wireless gateway 131-3 fails to respond within a corresponding timeout duration, the registration management resource 197-6 increments the counter 199-6 to indicate the number of times that the network server 191 did not properly receive a deregistration response transmitted by the wireless gateway 131-3.

More specifically, in this example, the network server 191 transmits a first deregistration request in the communications 870-1 and increments the counter 199-6 in response to failing to receive an appropriate deregistration response (such as acknowledgement) from the wireless gateway 131-3 within a timeout duration.

Because the wireless gateway 131-3 did not acknowledge or receive the deregistration request transmitted by the network server 191 in the communications 870-1, the gateway 131-3 transmits communications 845-2 including payload data for delivery to targeted one or more application servers 196. The wireless gateway 131-3 does not receive a respective acknowledgement from the network server 191 indicating that the network server 191 received the communications 845-2 within a timeout period. The receipt communications 845-2 itself indicates that the wireless gateway 131-3 did not acknowledge receipt of the communications 870-1. In such an instance, the registration management resource 197-5 increments the count value in the counter 199-5.

As further shown, the network server 191 transmits a second deregistration request in the communications 870-2 and subsequently increments the counter 199-6 in response to failing to receive an appropriate deregistration response from the wireless gateway 131-3 within a timeout duration.

Because the wireless gateway 131-3 did not acknowledge or receive the deregistration request transmitted by the network server 191 in the communications 870-2, the gateway 131-3 transmits communications 845-3 including payload data for delivery to targeted one or more application servers 196. The wireless gateway 131-3 does not receive a respective acknowledgement from the network server 191 indicating that the network server 191 received the communications 845-3 within a timeout period. In such an instance, the registration management resource 197-5 increments the count value in the counter 199-5.

If desired, the network server 191 can be configured to transmit a notification indicating the failed attempt by the network server 191 to receive a response from the network server 191. For example, the network server 191 can be configured to communicate a message in the communications 870-2 indicating the prior failure of the wireless gateway 131-3 responding to the original communications 870-1. Accordingly, the wireless gateway 131-3 can be notified of communication other issues associated with deregistration of the wireless gateway 131-3.

In a similar manner as previously discussed, the network server 191 can be configured to discontinue transmitting deregistration requests to the wireless gateway 131-3 in response to detecting that the magnitude of the count value stored in the counter 199-6 is greater than a respective threshold level. If the value of the counter 199-6 exceeds a respective threshold level, the network server 191 can be configured to automatically terminate the current registration of the wireless gateway 131-3 with the network server 191 and change the state of the wireless gateway 131-3 from the initialized state to the commissioned state. The wireless gateway 131-3 is then able to potentially register with a different network server 191.

In this example, rather than terminating the wireless gateway 131-3 from initialized state to commissioned or other state, the wireless gateway 131-3 does eventually receive the deregistration request and eventually respond with a corresponding deregistration response to the network server 191 via communications 875 transmitted from the wireless gateway 131-3 to the network server 191. The wireless gateway 131-3 and the network server 191 then transition the wireless gateway 131-3 to a commissioned state again in response to receiving the deregistration response from the network server 191.

Accordingly, deregistration can occur in response to detecting that a magnitude of the count value stored in the counter 199-5 and the count value in the counter 199-6 exceed a respective threshold value. Additionally, deregistration can occur in response to receiving a respective deregistration response from the wireless gateway 131-3 to the network server 191.

Thus, with respect to the deregistration procedure, embodiments herein include unilateral deregistration (abnormal case). For example, a network server 191 (a.k.a., NS) can be configured to deregister the wireless gateway 131-3 (a.k.a., GW) and notify it as per procedure, but the wireless gateway 131-3 may not receive the deregistration notification. In such an instance, the wireless gateway 131-3 keeps trying to communicate data payloads or other communications to the network server 191 (e.g., the wireless gateway 131-3 sends data frames on the current active session or subsequent sessions).

In contrast to a conventional NS deregistration request to the GW, as discussed herein, communication failure tracking techniques include tracking and providing acknowledgements of same.

Also, note that deregistration may be initiated/performed by the NS for GWs that are registered (in REGISTERED state). Note that there may be an instance when the NS sends a deregistration request to a GW that is not successfully REGISTERED with the NS (e.g. in COMMISSIONED state). In such an instance, the deregistration request generated by the network server 191 would be an error on the NS behavior (not an abnormal case as in the case when the GW never received the deregistration request from the NS). As discussed herein, the GW can be configured to keep a counter for this case.

Further, as previously discussed, embodiments herein include implementing one or more counters associated with the wireless gateway 131-3 and the network server 191.

A respective counter associated with a wireless gateway GW can be configured to count failed communication attempts with the NS (trying to send data frames on current session or new session attempt) when the GW is in REGISTERED state (but the GW doesn't know that the NS has deregistered it). Also, embodiments herein implement a counter at the NS because the GW may initiate a deregistration via communication of a deregistration request and the NS might not receive the deregistration request. The same logic applies to the GW→NS direction for the bullets below.

- After the one or more counter(s) reach a set limit (this limit could be set by the NS (operator) as part of the configuration procedure (NS→GW)) the GW does not attempt to continue the communication on the current session or attempt new sessions with the NS. At this point the GW deletes the current REGISTRATION context associated with this NS. i.e. it auto-deregisters with the NS.
- The GW may also have a timer (timer_failed_sessions_when_reg) linked to the failed_session_counter, for waiting until performing auto-deregistration once the counter reaches the limit.
- The GW may still maintain a record with the failed session attempts (failed_session_counter(s), registration id received from the NS at successful registration, etc.) and may send this information to the NS in a subsequent successful communication with the NS (same NS or an NS belonging to the same operator). [NOTE: we need to figure out if there are proprietary fields on the initialization messaging to send this, same for session management messages]. The subsequent successful communication could be at any stage of the communication with the NS (from COMMISSIONED. REGISTERED, INITIALIZED, SESSION ACTIVE, etc.)

The information (such as number of prior failed attempts, time of sending failed messages, etc.) sent to the NS in this subsequent successful communication may be a flag, the counter(s) or some other notification to the NS informing it of the abnormal situation.

The NS will also keep a record based on this notification from the GW/NS.

Embodiments herein include keeping a counter(s) such as deregistration_req_received_not_registered on the GW The count value of the counter is increased when the GW is not registered (i.e. not in REGISTERED state and doesn't have a REGISTRATION context) and it received a deregistration message from the NS.

The GW may send this information to the NS in a subsequent successful communication with the NS For the case on the other direction, the NS may send a flag or a GW configuration request or a GW Capabilities request to the GW in order to improve the operation of the GW and avoid subsequent failures.

As discussed herein, the GW can be configured to respond to the request to deregister from the NS. Also, the GW can now initiate deregistration and that request is also acknowledged by the NS.

Note further that either the wireless gateway or the network server can be configured to implement unilateral deregistration if:

The GW does not receive the request from the NS, or vice versa. Or they receive the request but do not respond. In that case each entity will keep a counter of not-acknowledged deregistration requests.

The GW can be configured to send a flag or the actual counter value in communications to the NS for network management purposes once the GW and NS re-establish the connection (subsequent successful registration).

The NS can be configured to send a flag or a GW configuration request or a GW capabilities request to the GW for GW operation management purposes once the GW and NS re-establish the connection (subsequent successful registration). [i.e., the NS might wish to change some parameters in the GW to avoid subsequent failures]

Figure 10:
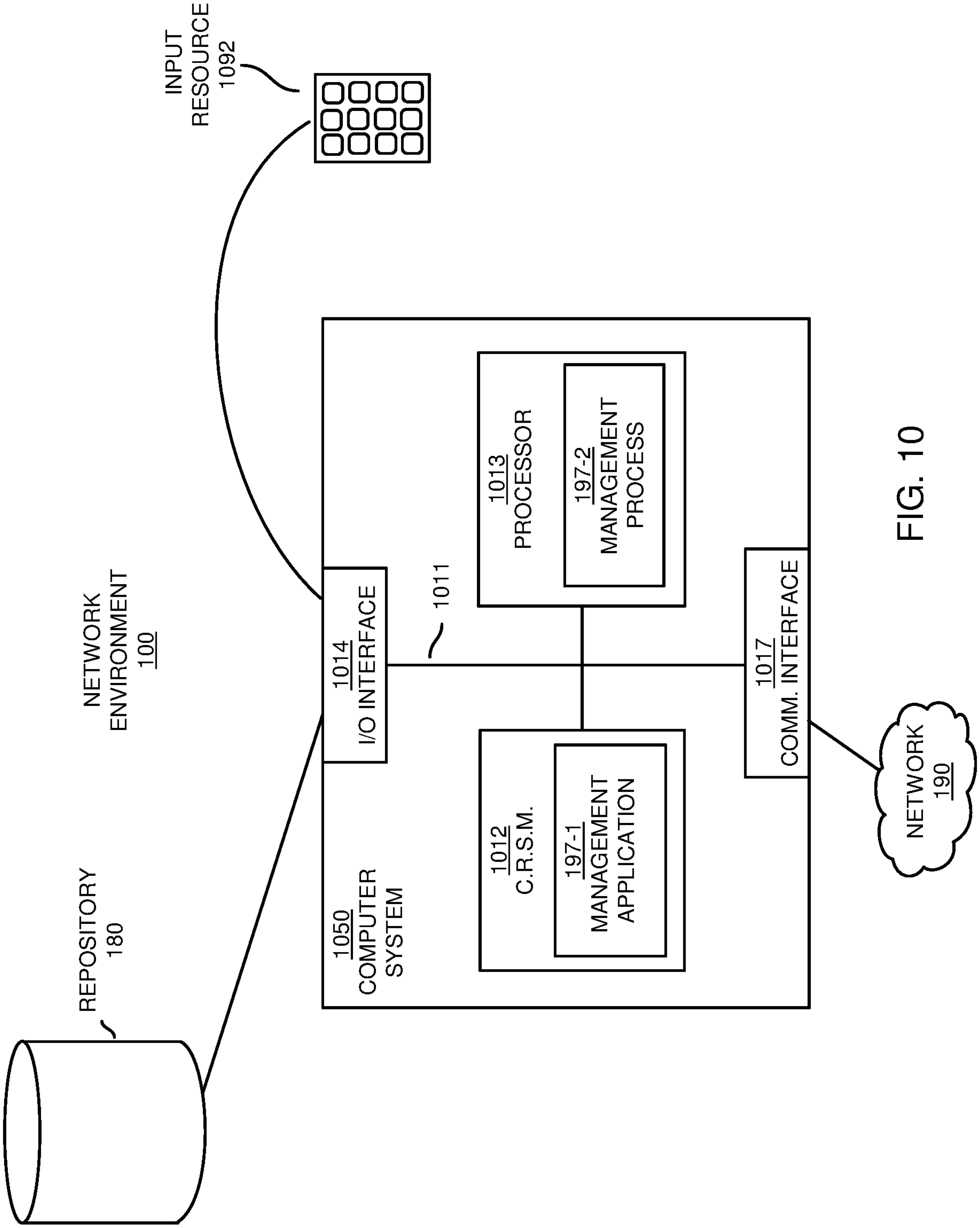
FIG. 10 is an example diagram illustrating example computer hardware and software operable to execute operations as discussed herein.

FIG. 10 is an example block diagram of a computer system for implementing any of the operations as previously discussed as discussed herein.

Note that any of the resources (such as registration management resource 197, network server 191, wireless gateway 131-3, network server 191, wireless gateway 131-3, etc.) as discussed herein can be configured to include computer processor hardware and/or corresponding executable instructions to carry out the different operations as discussed herein.

For example, as shown, computer system 1050 of the present example includes interconnect 1011 coupling computer readable storage media 1012 such as a non-transitory type of media (which can be any suitable type of hardware storage medium in which digital information can be stored and or retrieved), a processor 1013 (computer processor hardware), I/O interface 1014, and a communications interface 1017.

I/O interface(s) 1014 supports connectivity to repository 1080 and input resource 1092.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with management application 197-1 (e.g., including instructions) in a respective wireless station to carry out any of the operations as discussed herein.

During operation of one embodiment, processor 1013 accesses computer readable storage media 1012 via the use of interconnect 1011 in order to launch, run, execute, interpret or otherwise perform the instructions in management application 197-1 stored on computer readable storage medium 1012. Execution of the management application 197-1 produces management process 197-2 to carry out any of the operations and/or processes as discussed herein.

Those skilled in the art will understand that the computer system 1050 can include other processes and/or software and hardware components, such as an operating system that controls allocation and use of hardware resources to execute the management application 197-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1050 may reside at any location or can be included in any suitable resource in any network environment to implement functionality as discussed herein.

Functionality supported by the different resources will now be discussed via flowcharts in FIGS. 11 and 12. Note that the steps in the flowcharts below can be executed in any suitable order.

Figure 11:
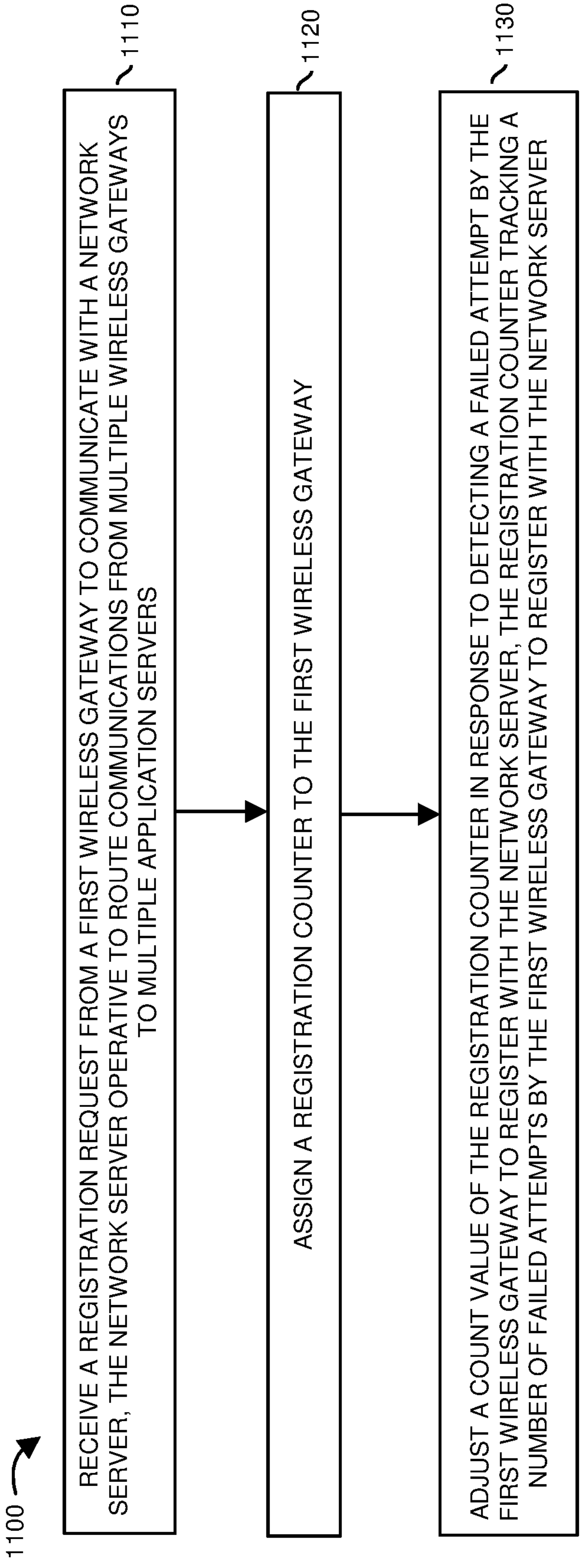
FIG. 11 is an example diagram illustrating a method as discussed herein.

FIG. 11 is a flowchart 1100 illustrating an example method as discussed herein. Note that there will be some overlap with respect to concepts as discussed above.

In processing operation 1110, the registration management resource 197 receives notification of a registration request from a first wireless gateway to communicate with a network server 191. The network server 191 is configured to route communications from multiple wireless gateways to multiple application servers 196.

In processing operation 1120, the registration management resource 197 assigns a registration attempt counter 199 to the wireless gateway 131-3.

In processing operation 1130, the registration management resource 197 adjusts a count value of the registration attempt counter 199 in response to detecting each failed attempt by the wireless gateway 131-3 to register with the network server. Thus, as previously discussed, the registration attempt counter tracks a number of failed attempts by the first wireless gateway to register with the network server.

Figure 12:
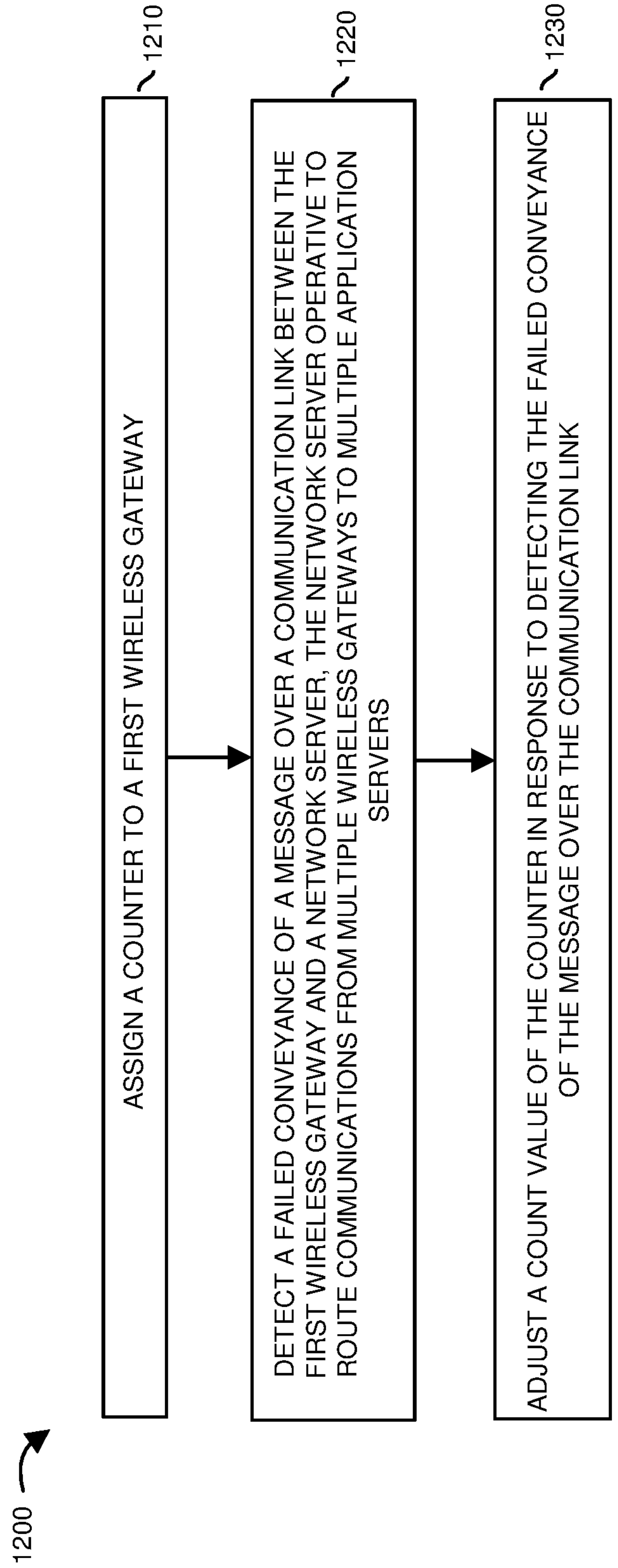
FIG. 12 is an example diagram illustrating a method as discussed herein.

FIG. 12 is a flowchart 1200 illustrating an example method as discussed herein. Note that there will be some overlap with respect to concepts as discussed above.

In processing operation 1210, a registration management resource 197 is assigned a counter to track the failed communications associated with a first wireless gateway 131-3 and/or network server 191.

In processing operation 1220, the registration management resource 197 detects a failed conveyance or execution of a message (such as a command) transmitted over a communication link between the first wireless gateway 131-3 and a network server 191. As previously discussed, the network server 191 such as a core network is operative to route communications from multiple wireless gateways to multiple application servers.

In processing operation 1230, the registration management resource 197 adjusts a count value of the counter in response to detecting the failed conveyance of a message (or failed execution of a respective command communicated) over the communication link.

Further Embodiments

A Registration attempt counter is used to limit the number of subsequently rejected registration attempts. The registration attempt counter may be incremented after each failed registration attempt.

The registration attempt counter may be stored at the NS (191), the GW (131-3) or both.

The registration attempt counter may be stored at the NS together with the GW profile information (or registration context for the GW for that registration session). The counter may be linked (stored together) to a unique ID of the GW and/or a unique ID for the registration session of the GW with the NS. The counter might also be linked to the error cause sent by the NS to the GW on the RegistrationFailure message. The counter might also be linked to historical data on successful registration attempts by the GW. The counter might also be linked to historical data on successful deregistration attempts by the GW. The storage data may be stored permanently or temporarily.

The registration attempt counter may be stored at the GW together with the NS information (or registration context for the GW for that registration session). The counters as discussed herein may be linked to a respective unique identifier value (ID) of the GW and/or NS, and/or a unique ID for the registration session of the GW with the NS. Yet further, the corresponding counter as discussed herein can be linked to historical data on successful registration attempts by the GW. Still further, the corresponding counter as discussed herein might also be linked to historical data on successful deregistration attempts by the GW. The storage data may be stored permanently or temporarily.

In accordance with further example embodiments, the respective registration attempt counter might be used by NS for:

Creating a report and/or performing analytics on the GW behavior or profiles

Taking actions related to the GW, for example baring the GW for a period of time or permanently Taking actions related to the GW, for example based on the error codes associated with the registration failures change some setting on the GW during inband or out of band signaling Or other suitable operations The registration attempt counter might be used by NS for:

Taking actions related to its configuration, for example based on the error codes associated with the registration failures request a change some setting on the GW profile in the NS during in band or out of band signaling Change settings/field on the next registration request command to the NS Creating a report and/or performing analytics Don't attempt a registration request with that NS (permanently or temporarily) and request a new (home/serving/assigned) NS from the assignment server (entity providing the "assigned NS" ID to the GW prior to registration phase).

Note again that techniques herein are well suited to manage registration of wireless gateways and track communication failures in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing." "computing." "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:

detecting a failed execution of a command transmitted over a communication link from a first wireless gateway to a network server, the network server operative to control routing of communications from multiple wireless gateways through the network server to multiple application servers;

adjusting a count value of a counter in response to detecting the failed execution of the command by the network server;

wherein the command is a registration request command to register the first wireless gateway with the network server to support conveyance of subsequent communications through the network server between the first wireless gateway and a first application server of the multiple application servers; and wherein the registration request command transmitted from the first wireless gateway to the network server is a first registration request command, the method further comprising: in response to detecting the failed execution of the first registration request command, transmitting a second registration request command from the first wireless gateway to the network server, the second registration request command indicating occurrence of the failed execution of the first registration request command transmitted from the first wireless gateway to the network server.

2. The method as in claim 1 further comprising:

discontinuing subsequent attempted registration of the first wireless gateway with the network server in response to detecting that a numerical value stored in the counter is greater than a threshold value, the numerical value indicating a number of times of the failed execution of the command by the network server.

3. The method as in claim 1, wherein the first wireless gateway is operative to retrieve a network address assigned to the network server from a proxy server and communicate the registration request command to the network address.

4. The method as in claim 1, wherein the command includes an identity of the first wireless gateway; and adjusting the count value of the counter in response to the network server detecting that the identity of the first wireless gateway is not present in a set of identities of wireless gateways supported by the network server.

5. The method as in claim 1 further comprising:

creating the counter assigned to the first wireless gateway in response to receiving the registration request command from the first wireless gateway, the registration request command being a first attempt by the first wireless gateway to register with the network server.

6. The method as in claim 1 further comprising:

at the first wireless gateway, discontinuing subsequent attempted registration with the network server in response to detecting that a numerical value stored in the counter is greater than a threshold value.

7. The method as in claim 1, wherein the registration request command is a first registration request command, the method further comprising:

receiving a notification from the network server, the notification instructing the first wireless gateway to modify the first registration request command to produce the second registration request command for transmission to the network server in response to detecting that a numerical value stored in the registration counter is greater than a threshold value.

8. The method as in claim 7 further comprising:

at the first wireless gateway, modifying the second registration request command to produce a third registration request command in response to receiving the notification; and communicating the third registration request command from the first wireless gateway to the network server.

9. The method as in claim 1, wherein the command includes a data packet transmitted from the first wireless gateway for delivery over the communication link and to the network server.

10. The method as in claim 9, wherein the count value in the counter indicates a number of detected failed conveyances of a respective message including the command over the communication link from the first wireless gateway to the network server, the method further comprising:

discontinuing subsequent attempted transmission of communications from the first wireless gateway over the communication link to the network server in response to detecting that the number of detected failed conveyances of the respective messages as stored in the counter is greater than a threshold value.

11. The method as in claim 1, wherein the first wireless gateway is assigned a first network address;

wherein a second wireless gateway is assigned a second network address; and the method further comprising: i) mapping the first network address to the second network address, and ii) based on the mapping, transmitting the registration request command from the first wireless gateway to the network server.

12. The method as in claim 1, wherein the counter is a first counter operative to count a number of times that the first wireless gateway attempts to register the first wireless gateway with the network server to communicate with a first application server of the multiple application servers; and implementing a second counter associated with the network server, the second counter counting a number of attempts of the network server transmitting registration response messages to the first wireless gateway.

13. The method as in claim 1, wherein the second registration request command indicates a numerical value stored in the counter.

14. The method as in claim 1, wherein the counter is a first counter;

where in the count value is a first count value, the method further comprising:

implementing a second counter at the first wireless gateway, the second counter storing a second count value indicating a number of attempts by the first wireless gateway to terminate registration of the first wireless gateway with the network server.

15. The method as in claim 14 further comprising:

in response to detecting that the magnitude of the second count value is greater than a threshold level, modifying the state of the first wireless gateway to a commissioned state.

16. The method as in claim 1, wherein the counter is a first counter;

where in the count value is a first count value, the method further comprising:

implementing a second counter at the network server, the second counter storing a second count value indicating a number of attempts by the network server to terminate registration of the first wireless gateway with the network server.

17. The method as in claim 16 further comprising:

in response to detecting that the magnitude of the second count value is greater than a threshold level, modifying the state of the first wireless gateway to a commissioned state.

18. The method as in claim 1 further comprising:

subsequent to successful registration of the first wireless gateway with the network server, transmitting the subsequent communications from the first wireless gateway through the network server to a first application server of the multiple application service.

19. A system comprising:

communication management hardware operative to:

detect a failed execution of a command conveyed over a communication link between a first wireless gateway and a network server, the network server operative to control routing of communications from multiple wireless gateways through the network server to multiple application servers;

adjust a count value of a counter in response to detecting the failed execution of the command conveyed over the communication link; and wherein the command is a registration request command to register the first wireless gateway with the network server to support connectivity through the network server between the first wireless gateway and a first application server of the multiple application servers; and wherein the registration request command transmitted from the first wireless gateway to the network server is a first registration request command, the communication management hardware further operative to: in response to detecting the failed execution of the first registration request command, transmit a second registration request command from the first wireless gateway to the network server, the second registration request command indicating occurrence of the failed execution of the first registration request command transmitted from the first wireless gateway to the network server.

20. The system as in claim 19, wherein the communication management hardware is further operative to:

discontinue subsequent attempted registration of the first wireless gateway with the network server in response to detecting that a numerical value stored in the counter is greater than a threshold value.

21. The system as in claim 19, wherein the first wireless gateway is operative to retrieve a network address assigned to the network server from a proxy server and communicate the request command to the network address.

22. The system as in claim 19, wherein the command includes an identity of the first wireless gateway;

wherein the communication management hardware is further operative to: adjust the count value of the counter in response to the network server detecting that the identity of the first wireless gateway is not present in a set of identities of wireless gateways supported by the network server.

23. The system as in claim 19, wherein the communication management hardware is further operative to:

create the counter assigned to the first wireless gateway in response to receiving the registration request command from the first wireless gateway, the registration request command being a first attempt by the first wireless gateway to register with the network server.

24. Computer-readable storage hardware having instructions stored thereon, the instructions, when carried out by computer processor hardware, cause the computer processor hardware to:

detect a failed execution of a command conveyed over a communication link between a first wireless gateway and a network server, the network server operative to route communications from multiple wireless gateways to multiple application servers;

adjust a count value of a counter in response to detecting the failed execution of the message conveyed over the communication link;

wherein the command is a registration request command communicated from the first wireless gateway to the network server to register the first wireless gateway with the network server to communicate with a first application server of the multiple application servers; and wherein the registration request command transmitted from the first wireless gateway to the network server is a first registration request command, the computer processor hardware further operative to: in response to detecting the failed execution of the first registration request command, transmit a second registration request command from the first wireless gateway to the network server, the second registration request command indicating occurrence of the failed execution of the first registration request command transmitted from the first wireless gateway to the network server.

* * * * *